Sept. 8, 1959  E. B. WILLIAMS  2,902,922
BALE DENSITY CONTROL DEVICE
Filed Sept. 24, 1957  4 Sheets-Sheet 1

INVENTOR
Edred B. Williams

BY
MEAD, BROWNE, SCHUYLER & BEVERIDGE
ATTORNEYS

Sept. 8, 1959

E. B. WILLIAMS 2,902,922

BALE DENSITY CONTROL DEVICE

Filed Sept. 24, 1957

INVENTOR
Edred B. Williams

BY
MEAD, BROWNE, SCHUYLER & BEVERIDGE
ATTORNEYS

Sept. 8, 1959

E. B. WILLIAMS 2,902,922

BALE DENSITY CONTROL DEVICE

Filed Sept. 24, 1957

INVENTOR
Edred B. Williams

BY
MEAD, BROWNE, SCHUYLER & BEVERIDGE
ATTORNEYS

United States Patent Office 2,902,922
Patented Sept. 8, 1959

2,902,922

BALE DENSITY CONTROL DEVICE

Edred B. Williams, Birmingham, Mich., assignor to Sherman Products, Inc., Royal Oak, Mich., a corporation of Michigan Application September 24, 1957, Serial No. 685,834

11 Claims. (Cl. 100—43)

This present invention relates to a bale density control device and more precisely, to a mechanism for accurately controlling the density of the bales of hay, straw, or the like made by an automatic hay baler.

In the field baling of hay, straw or the like grave problems arise in connection with the necessity of obtaining bales of uniform density. Changing moisture content, size of windrows, speed of baling and other variables make difficult the control of the bale density to provide uniform, tightly tied bales.

In modern automatic tie balers, the hay is compressed by a ram against the resistance to sliding movement of previously formed and tied bales occupying the rear end of the bale chamber. The resistance to movement of this bale through the bale chamber is determined by (1) inertial force necessary to accelerate the bale and (2) frictional resistance of the hay. The inertial forces are determined by the mass of the bales in the chamber and the magnitude of the acceleration. The frictional resistance of the hay is determined by the coefficient of friction and the amount of force placed on the periphery of the bale.

Both the coefficient of friction and the mass of the material varies between different materials and also with the moisture content. The magnitude of the acceleration varies with the compressibility of the material or springness, with the size of the pad being compressed, and with the number of strokes per minute of the ram.

In a baler, a change in one of the parameters that determines the density of a bale will start a chain of events which will magnify that change. For instance, if a pad of hay is less dense, the inertial forces on the second pad of hay is less, which causes less peripheral pressure. The third pad of hay is compacted even less, for it feels the loss of the inertial force and also of frictional forces. An analysis of the other parameters leads to the same conclusion; an error that tends to make a bale lighter or heavier is magnified by the other parameters.

In the past, balers of this type were provided with bale chambers having at their rear ends two or more movable sides which are moved towards and away from one another to change the cross sectional area of the exit. Conventionally, the movable sides are urged toward one another and into contact with the formed bale by springs, the spring load urging the movable sides constantly against the hay. The density of the bale is regulated by changing the length of the springs, which in turn determines the amount of frictional resistance the hay in the bale chamber will offer.

This method is useful to regulate the density of the bales, providing that the moisture content, size of pads and other parameters are unvarying. Unfortunately, however, in most fields of hay, the conditions are not uniform. If one parameter changes, such as moisture content for instance, in such a way as to make the bale heavier, the following pads are compressed more due to inertial effects and will also tend to increase the peripheral pressure. This peripheral pressure will expand the movable sides; this action, however, will increase the load applied by the springs, which will tend to make the bales more dense.

Although the problem of keeping a constant pressure on the periphery of the bale has long existed within the art, there has not been previously provided any inexpensive, relatively foolproof method of obtaining a constant pressure on the sides of the bales. Various hydraulic or pneumatic mechanisms have been suggested for exerting a constant compression force on the bale, but such devices have proved to be cumbersome, extremely expensive, quite complicated in their structure and function, and unadaptable to different types of balers.

The present invention now provides an improved apparatus for insuring the ejection of bales of constant density from the exit end of a bale case. Generally, the device of the present invention provides at least one movable side element for the bale case delivery end, spring means urging the side element into contact with the hay under a compression force, thus providing frictional resistance to bale movement, and means for keeping the spring means at a constant length despite variations in the position of the movable side element. By maintaining the spring means at a constant length, a constant compressive force is exerted by the spring means regardless of the position of the movable element, and the bale passing through the delivery end is subjected to a substantially constant compressive force, resulting in the formation of bales of uniform density.

More particularly, an extremely simple regulating mechanism is provided to ensure the exertion of a constant compressive force upon the bale case movable side. Briefly, this mechanism comprises a spring reaction member, a feeler element movable with the movable bale case side element as the element is urged against the hay under the compressive force of the spring, means for detecting the position of the feeler, and means actuated in response to the detection means for adjusting the reaction member to maintain the spring length constant. The apparatus suitably may comprise a pair of limit switches movable with the reaction element, a switch-actuating arm movable with the movable bale case wall and the reaction member, and means for adjusting the screw to set the desired spring length and, therefore, the desired pressure on the hay.

It is, therefore, an important object of the present invention to provide an improved mechanism for accurately controlling the density of bales of hay, straw or the like made by an automatic hay baler.

Another important object of this invention is the provision of an improved control mechanism for a hay baler or the like and including at least one movable wall partially defining a bale chamber and spring means urging the wall into engagement with hay disposed in the chamber, together with means for maintaining the spring means at a constant length so as to exert a constant compressive force upon the bale regardless of the actual position of the movable side of the bale chamber.

It is a further object of this invention to provide a new and improved mechanism for urging ap air of movable bale chamber side plates into contact with a bale interposed therebetween, the means including a compression spring, means responsive to the position of the movable side plates, and power means for adjusting the springs to maintain a constant spring load on the bale.

Yet another important object is the provision of an improved density control for a baler or the like having a movable side plate contacting a baler under the influence of a compression spring and including sensing means responsive to the position of the plate relative to a spring, reaction element and adjusting means for positioning the reaction element to retain the spring at a constant length regardless of the position of the plate.

Further objects and advantages of the invention will become apparent from the following specification taken in conjunction with the accompanying drawings in which.

Figure 5:
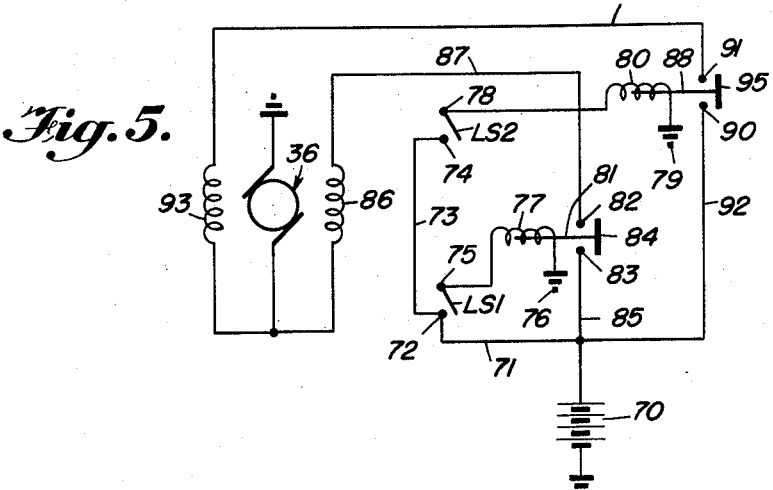

And Figure 5 is a diagrammatic view of the electrical control system for the mechanism.

Figure 1:
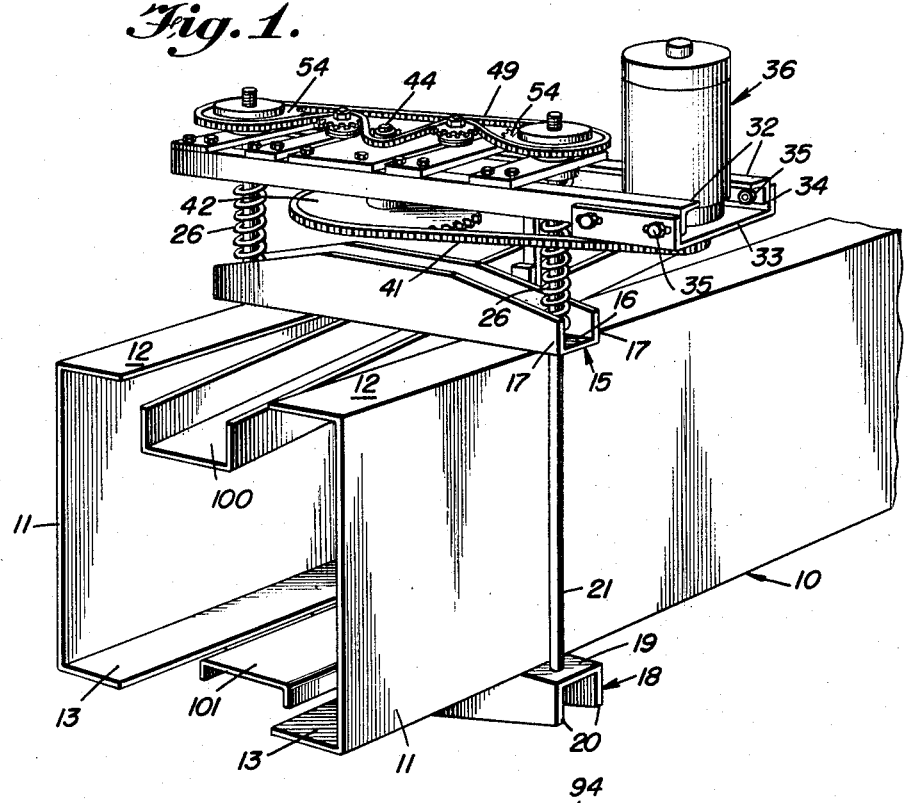
Figure 1 is a fragmentary perspective view of a bale case provided with the bale density control mechanism of the present invention.

As shown on the drawings:

In Figure 1, reference numeral 10 refers generally to the bale case of an automatic hay baler. In the fragmentary view, only the rear end of the bale case is shown, the forward end of the bale case, including the hay feeding, compacting, and tying mechanisms being eliminated for purposes of clarity.

Figure 3:
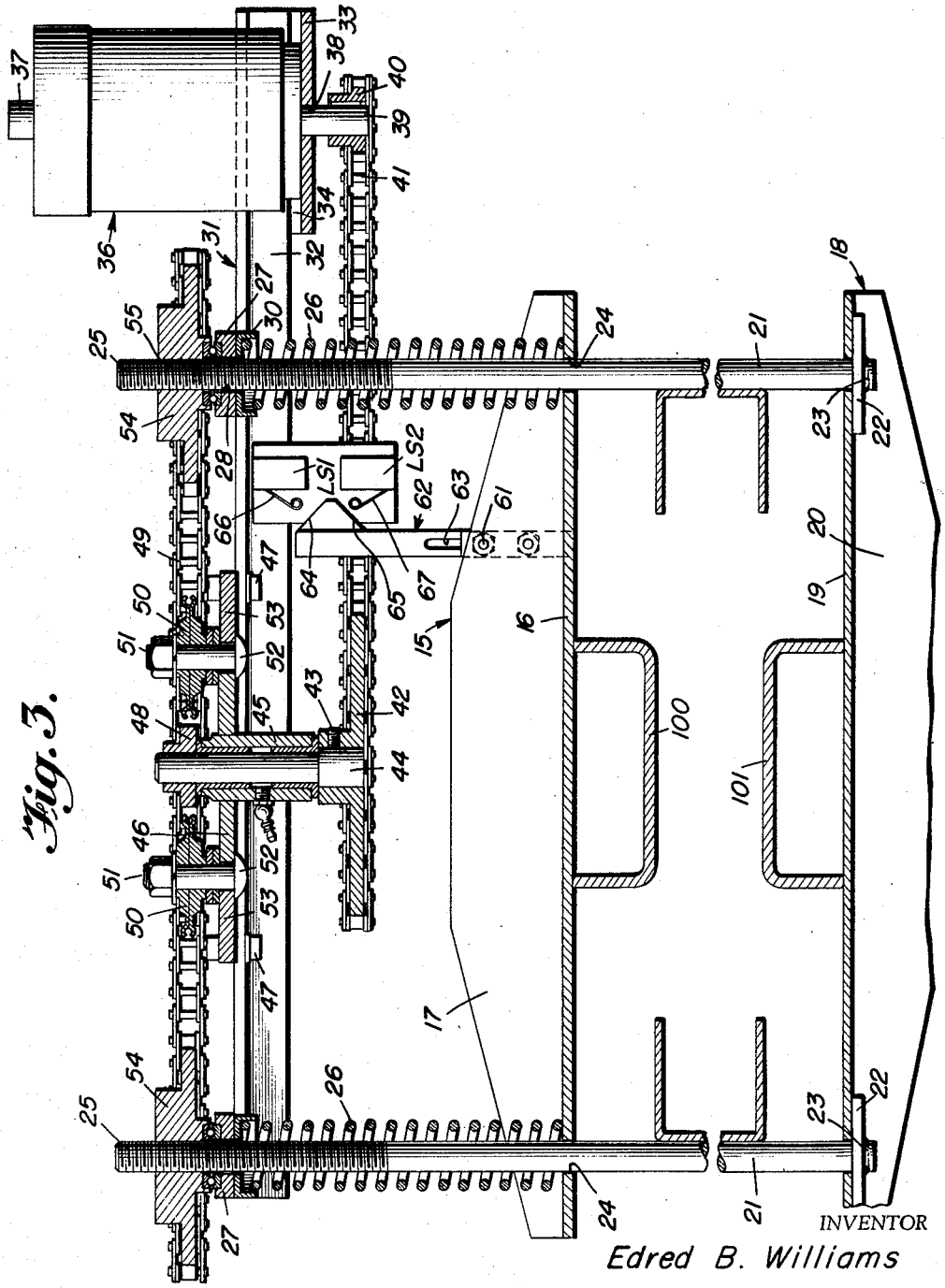
Figure 3 is a vertical sectional view of the mechanism.
Figure 4:
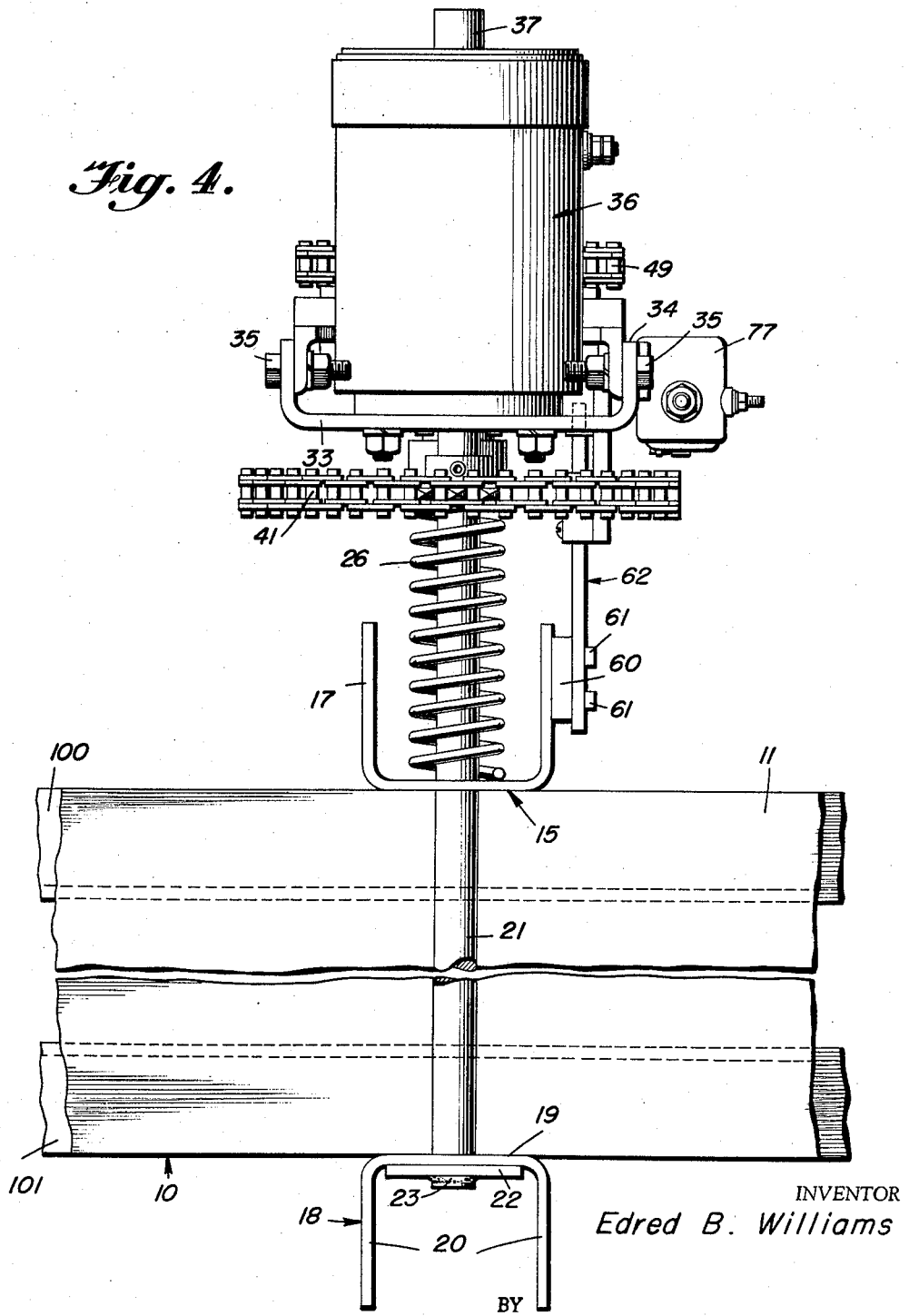
Figure 4 is a side elevation of the mechanism.

More particularly, the bale case 10 comprises a pair of fixed side walls 11 in the form of elongated, edge set channels having upper and lower inwardly extending flanges 12 and 13, respectively. Superimposed over the side walls 11 and extending transversely across is a generally U-shaped channel indicated generally at 15, this channel having a bottom wall 16 and a pair of spaced upstanding side flanges 17 (Figures 3 and 4). A similar channel 18 underlies the side walls 11, this lower channel having a central or web portion 19 and a pair of depending side walls 20.

Joining the channels 15 and 18 is a pair of generally vertically disposed, elongated tie rods 21, the tie rods 21 terminating at their lower ends at an enlarged, square washer 22 welded, as at 23, to the tie rods 21 and contacting the under surface of the web portion 19 of the channels 20. The square contour of the washers 22 prevents the rotation of the tie rods. As best shown in Figures 1 and 3, the tie rods 21 extend upwardly along side the side walls 11 but exteriorly thereof, to project freely through enlarged apertures 24 formed in the web portion 16 of the upper channel 15.

The tie rods project through the apertures 24 and extend thereabove with the upper free ends of the tie rods being peripherally threaded, as at 25. Surrounding that portion of each of the tie rods 21 which projects above the web portion 16 of the upper channel 15 is a coil compression spring 26. Each of the springs 26 is effectively interposed between the channel web 16 and an upper longitudinally extending crossbar 27 apertured, as at 28, to receive the tie rod 21 therethrough and having a downwardly dished spring cup 30 peripherally enclosing the upper extremity of the spring 26.

The crossbars 27 form a part of the main upper support frame, indicated generally at 31 (Figure 2), and including a pair of transversely extending, elongated angle irons or the like 32, these angle irons being extending parallel to and in vertical alignment with the webs 16 and 19 of the channels 15 and 18, respectively.

The angle irons 32 are joined adjacent their outer extremities by an additional support plate 33 having upturned terminal flanges 34 joined to the angle irons by suitable means, as by bolts and associated nuts 35. Superimposed on the lower support plate 33 is an electric motor indicated generally at 36 and having a vertically extending rotatable shaft 37 projecting downwardly through an aperture 38 formed centrally of the plate 31. The lower projecting end of the shaft 37 is keyed, as at 39, to a sprocket 40 having lapped thereabout a driving chain 41. This driving chain 41 extends transversely beneath the frame 31 to generally overlie the central portion of the upper channel 15, at which point the chain laps a driven sprocket 42 keyed to a vertically extending driven shaft 44. A set screw 43 retains the sprocket 42 against displacement from the shaft 44. This shaft 44 is supported in a bearing 45 suspended from a support plate 46 bridging the angle irons 32 and secured thereto by suitable means, as by nuts and associated bolts 47.

The freely projecting upper end of the shaft 44 carries a smaller sprocket 48 about which is lapped a driven chain 49. This chain 49 contacts a pair of idler sprockets 50 carried by stub shafts 51 having enlarged heads 52 contacting the under surface of the cross piece of the cross plate 46 and additional outer cross plates 53 joining the angle irons 32. The closed loop of the sprocket chain 49 encompasses the periphery of a pair of additional larger driven sprockets 54 each of which surmounts the associated tie rod 21. The respective tie rod threaded ends 25 are each received by the threaded interior axial bores 55 of the sprockets 54.

Figure 2:
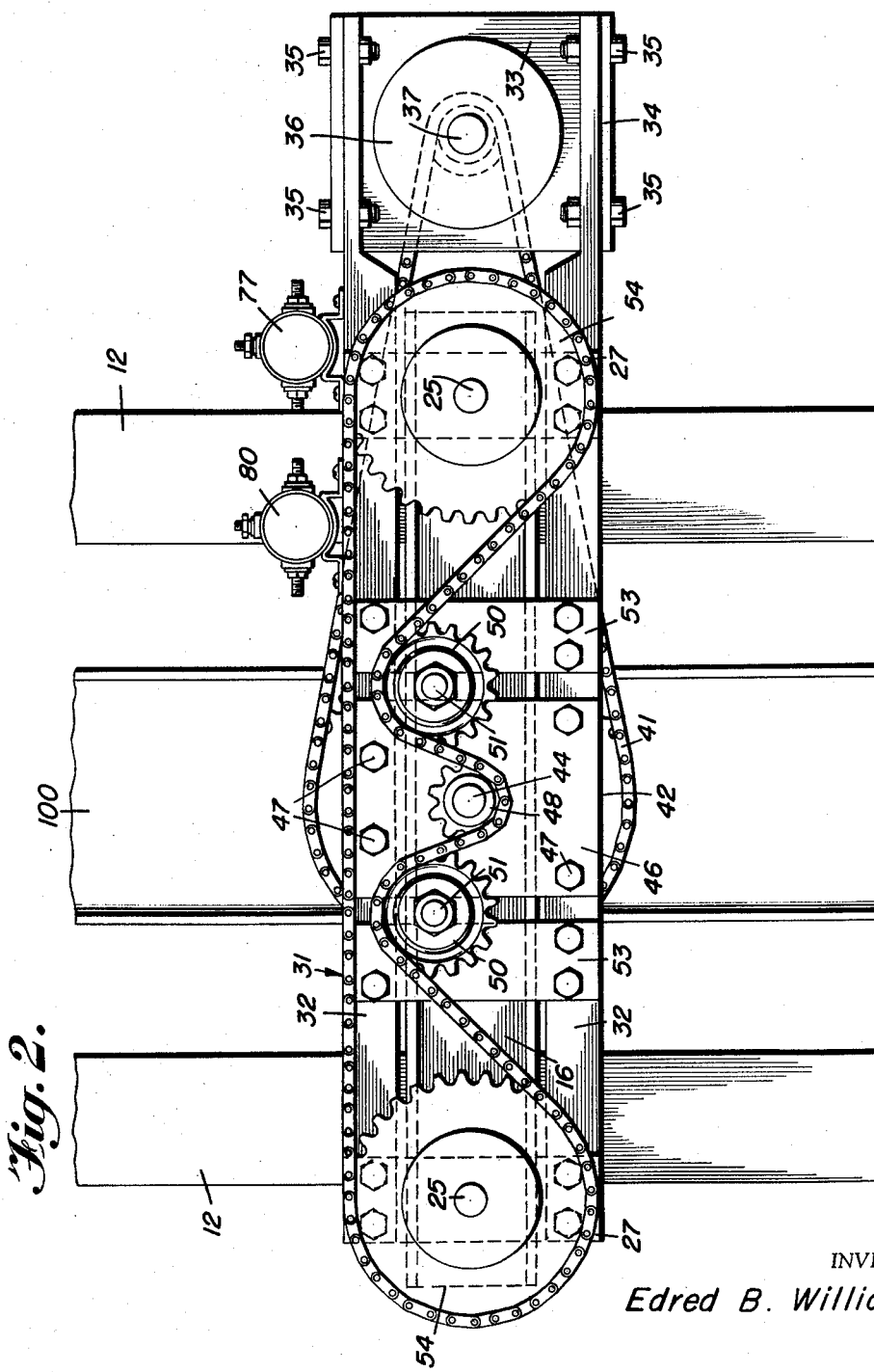
Figure 2 is a plan view of the mechanism of Figure 1.

From a study of Figures 1 and 2, it will be appreciated that actuation of the motor 36 will cause rotation of the relatively small sprocket 40 to drive the larger sprocket 42 through the chain 41. The difference in size between the sprockets 40 and 41 will result in the sprocket 42 being driven at a substantially lower speed, the ratio being preferably one revolution of the sprocket 42 for each four revolutions of the sprocket 40. The sprocket 42 will drive the vertical shaft 41 and the sprocket 48, with rotation of sprocket 48 driving the chain 49 and the associated threaded sprockets 54. Here again, a substantial drive reduction is obtained, one rotation of each of the sprockets 54 being accomplished for each four rotations of the sprocket 48. Of course, the idler sprockets 50 do not change the reduction drive between the sprockets 48 and 54. These idler sprockets 50 serve merely to maintain tension in the chain 49, the sprockets being adjustable transversely with respect to the plates 46 and 53 for this purpose. The enlarged heads 52 of the shafts 54 engage with the adjacent plates 53 and 46, respectively and loosening of the shaft nuts will accommodate transverse adjustment of the idler sprockets 50 to maintain the chain taut.

On one of the side plates of the channel 15 is a block 60 secured to the channel by the screws 61 (Figure 4). Carried by this block 60 and the screws 61 is a vertically extending actuating arm 62, this actuating arm having vertically elongated slots 63 therein to accommodate vertical adjustment of the arm relative to the channel 15 through the screws 61. The upper end of the arm 62 terminates in a pair of inclined upper and lower cam surfaces 64 and 65 respectively which are adapted to be positioned between a pair of limit switches LS1 and LS2. These limit switches LS1 and LS2 are provided with pivoted actuation arms 66 and 67 terminating in closely spaced relation to the surfaces 64 and 65, respectively.

Inasmuch as the arm 62 is carried by the channel 15, it will be seen that vertical displacement of the channel without corresponding vertical displacement of the subframe 31 will cause actuation of one or the other of the limit switches LS1 or LS2.

As indicated in Figure 5 of the drawing, these switches LS1 and LS2 form a portion of a wiring circuit for the motor 36, the circuit including a battery 70 or other source of direct current connected through lead line 71 to a terminal 72 forming a portion of limit switch LS1. From the terminal 72, a second lead line 73 feeds current to a terminal 74 forming a portion of limit switch LS2. The other terminal 75 of limit switch LS1 is connected to ground 76 through the windings 77 of a solenoid. The other terminal 78 of limit switch LS2 is connected to ground 79 through a second solenoid winding 80. The winding 77 surrounds the core 81 of a solenoid switch having terminals 82 and 83 and a switch contact bar 84 carried by the core 81. The solenoid terminal 83 is connected to the source 70 through the line 85 and is connected to one side 86 of the motor 36 through lead line 87. The solenoid winding 80 surrounds the core 88 of a second solenoid switch having terminals 90 and 91 connected to the source, through lead line 92, and to the side 93 of the motor 36 through lead line 94. The solenoid core 88 carries a contact 95.

Obviously, actuation of the limit switch LS1 to connect the terminals 72 and 75 will actuate the solenoid winding 77 so as to close contacts 82, 83 through the contact bar 84, thus energizing the one side 86 of the motor 36. Conversely, closing of the limit switch LS2 will energize the other side 93 of the motor 36.

From Figures 1 and 3, it will be seen that the channels 15 and 18 carry bale contact channels 100, 101, respectively. These channels 100, 101 are inclined slightly with respect to one another and with respect to the horizontal longitudinal plane of the bale case. The channels 100, 101 thus extend into contact with the hay and tend to choke the otherwise free open end of the bale case, the choking effect increasing rearwardly to the open end due to the inclination of the channels 100, 101.

The channels 100, 101 open against the pressure of springs 26 upon contact with the hay. The spring reaction pushes the channels against the hay and the frictional force exerted on the hay retards the movement of the hay from the bale chamber delivery end.

Operation

The operation of the device of the present invention will be readily understood from a study of the foregoing description and of the drawings. However, the theory of the operation is hereinafter explained, together with the manner in which the device functions to maintain constant pressure upon hay being ejected from the bale case.

As hereinbefore explained, the compression of a bale being formed in the bale case ahead of the exit end thereof is determined by the resistance to movement of previously formed bales interposed between the two bale contact channels 100, 101. The exact resistance to movement of the bale between the channels at any given time is dependent upon the coefficient of friction and the force exerted on the sides of the bale. About the only practical way of insuring constant resistance to movement of the hay through the bale chamber is by providing a constant pressure on the channels 100, 101 which contact the previously formed bale.

The springs 26 urge the contact channels 100, 101 into contact with the previously formed bale, the upper channel 100 being urged against the bale directly by the compression force of the springs 26 and the lower channel being urged upwardly by the tie rods 21. The channels thus will resist the movement of the previously formed bale through the open exit end of the bale chamber, this resistance being proportional to both the force applied by the springs 26 and the coefficient of friction of the hay. To maintain constant pressure on the bale sides, a constant spring load is required to maintain a constant spring load in a compression spring in a type of springs 26, the spring must be maintained at a substantially constant length, and this is the function of the apparatus heretofore disclosed.

Assume that the device has been set so that bales of constant density are being produced, but that the hay gradually becomes more dry as it lays in the sun. The amount of force necessary to compress the dryer hay is less than that previously exerted, and the springs 26 elongate inasmuch as it is now possible for the springs to urge the channels 100, 101 further into the bale. This elongation of the spring would ordinarily reduce their compression force under these circumstances, the channels 100, 101 move closer together, the channel 100 extending further down into the bale case and dropping the carrying channel 15 correspondingly.

Thus, the cam surface 65 will contact the limit switch, the actuation arm of limit switch LS2, thus closing the switch. Closure of the limit switch LS2 will energize the solenoid winding 80, thereby closing the switch contacts 90, 91, with the contact bar 95. The side 93 of the motor 36 will thus be energized and the motor will run in a direction such as to rotate the sprocket 40, driving the chain 41 to rotate the sprocket 42. Rotation of the sprocket 42 will cause rotation of the shaft 44 and the sprocket 48, the sprocket 48 through its chain 49 driving the nut sprocket 54 in a direction such that the nut sprockets will be run down the threads 25 of the tie rods 21, thus shifting the main upper support frame 31 downwardly to further compress the spring 26. When the frame 31 has reached a position at which the distance between the frame 31 and the bottom 16 of the channel 15 is at the nominal distance, so that the springs 26 assume their predetermined length, the limit switch LS2 will be lowered with the frame 31 to remove the actuation arm 67 thereof from contact with the cam surface 65 and the cam will occupy its medial or neutral relative position illustrated in Figure 3 of the drawings. At this time, actuation of the motor 36 is halted, the springs 26 are of their constant length, the compression effect of the springs 26 will be the same as that heretofore obtained and a constant pressure will be exerted upon the bale through the channels 100, 101.

Structurally, it will be noted that the entire main frame 31 is supported upon the springs 26, and the tie rods 21 act in tension to pull the lower contact channel 101 upwardly, the springs 26 themselves forcing the upper channel 100 downwardly into contact with the hay. The entire main frame thus functions as a spring reaction element.

In the event that the hay becomes more wet and dense, the reverse operation will be accomplished with the channel 100 tending to ride higher upon the hay, to actuate the contact arm 66 with the limit switch LS1, energizing the other side 86 of the motor through the closure of contact points 82, 83 by the contact bar 84. This upward movement of the channel 15 will be followed by upward movement of the frame 31 to elongate the spring to the previously set length, thus maintaining a constant spring load.

Thus, it will be seen that the present invention provides an extremely simple apparatus for maintaining a constant pressure upon a hay bale positioned at the exit end of a bale case and effective to insure the delivery of bales of constant density at the delivery end of the bale case. The utiliziation of the limit switches LS1, LS2 in combination with the cam having cam faces 64, 65 positions the floating sub-frame 31, so as to maintain the springs 26 in constant length regardless of the degree of penetration of the contact channels 100, 101 in the bale. The complete assembly of the present invention is located outside the bale case proper and is superimposed thereover so as to accommodate the ready assembly of the unit upon balers of any size, capacity, or type. The ready adjustability of arm 62 promotes this universal adaptability, while the use of a sprocket and chain type drive insures the positive driving of the components under adverse weather or operating conditions. The cam 62 is also adjustable to predetermine the length of the springs 62, so that the operator can set the desired bale density.

What I claim to be my invention is:

1. A bale density control device for use with a bale case, the delivery end of which is provided with at least one movable side element, comprising variable length spring means for displacing said side element into contact with hay in the delivery end of said bale case, a reaction element for said spring means, screw means for adjusting said reaction element toward and away from said side element, actuatable power means for rotating said screw means in either direction to correspondingly adjust said reaction element, and means responsive to the displacement of said side element relative to said reaction element to actuate said power means so as to maintain a substantially constant side element-to-reaction element dimension and a substantially constant spring force on said hay.

2. In a baler having a bale case, the delivery end of which is provided with at least one movable side element, a coiled compression spring urging the movable side element into the bale case for contact with hay compressed therein, and a screw projecting axially thru said spring, the improvements of a nut threadedly engaging said screw, actuatable power means for driving said nut in either rotative direction, a reaction element urged by said nut into contact with said spring and cooperating with said movable side to confine said spring therebetween and means responsive to variations in the spring length for actuating said power means to drive said nut in the rotative direction effective to maintain the spring length substantially constant.

3. A bale density control device for use with a bale case, the delivery end of which is provided with at least one movable side element, comprising variable length spring means for displacing said side element into contact with hay in the delivery end of said bale case, reaction means cooperable with said side element to confine said spring means therebetween, screw means for varying the spring length, actuatable power means for rotating said screw means in either direction to correspondingly adjust the spring length, and means responsive to the displacement of said side element relative to said reaction element to actuate said power means so as to maintain a substantially constant spring length and a substantially constant spring force on said hay.

4. A bale density control device for use with a bale case, the delivery end of which is provided with at least one movable side element, comprising a variable length compression spring for urging said side element into contact with hay in the delivery end of said bale case, means attachable to said side element for movement therewith, a threaded reaction element for said spring, screw means threadedly engaging said reaction element for adjusting said reaction element toward and away from said side element, electric motor means for rotating said screw means in either direction to correspondingly adjust said reaction element, means movable with said reaction element for cooperation with said first-named means, and an electric circuit for actuating said motor means and incorporating said first-named and last named means to actuate said power means so as to maintain a substantially constant side element to-reaction element dimension and a substantially constant spring force on said hay.

5. In a baler having a bale case, the delivery end of which is provided with at least one movable side element, a coiled compression spring urging the movable side element into the bale case for contact with hay compressed therein, and a screw projecting axially thru said spring, the improvements of a nut threadedly engaging said screw, reversible motor means for driving said nut in either rotative direction, a reaction element carried by said nut and cooperating with said movable side to confine said spring therebetween, and means responsive to variations in the spring length for actuating said power means to drive said nut in the rotative direction effective to maintain the spring length substantially constant, said last-mentioned means including an electric supply circuit for said motor means, limit switches interposed in the circuit and means responsive to the relative positions of said reaction means and said movable side elements.

6. In a baler having a bale case, the delivery end of which is provided with at least one movable side element, a coiled compression spring urging the movable side element into the bale case for contact with hay compressed therein, and a screw projecting axially thru said spring, the improvements of a nut threadedly engaging said screw, a reversible electric motor for driving said nut in either rotative direction, said nut operatively cooperating with said movable side to confine said spring therebetween, an electric circuit for energizing said motor and including first and second limit switches for energizing the motor to alternatively drive the motor in either direction, respectively, and means movable with said side element to actuate one or the other of said limit switches, energization of said motor being effective to drive said nut in the proper rotative direction to maintain the spring length substantially constant.

7. A bale density device comprising a pair of opposing side plates at the delivery end of a bale case, means carrying said plates for displacement toward and away from one another to variably restrict the bale case delivery end, spring means urging said plates against hay in the bale case, and means operable automatically in response to predetermined displacement of said plates for maintaining constant spring pressure on said plates despite the displacement of the plates.

8. The device of claim 7, wherein the last-mentioned means includes spaced means confining the spring means under compression, feeler means responsive to relative movement of said spaced means, and power means actuated by said feeler means to adjust said spaced means to a substantially fixed spaced distance.

9. The device of claim 8, wherein the power means includes a reversible electric motor, a limit switch and a switch actuation arm positioned, respectively, by said spaced means, and a motor-actuation circuit including said limit switch.

10. A bale density device comprising a pair of opposing bale contact members at the delivery end of a bale case, means carrying said members for displacement toward and away from one another to variably restrict the bale case delivery end, spring means urging said members against hay in the bale case, and means for maintaining constant spring pressure on said members despite the displacement thereof including spaced means confining the spring means under compression, feeler means responsive to relative movement of said spaced means and power means actuated by said feeler means for adjusting said spaced means to a substantially fixed spaced distance.

11. The combination set forth in claim 10 wherein the power means includes a reversible electric motor, a limit switch and a switch actuation arm positioned respectively by said spaced means and a motor actuation circuit including said limit switch.

References Cited in the file of this patent
UNITED STATES PATENTS

| Re. 24,155 | Bornzin | May 22, 1956 |
| 2,628,554 | Phillips | Feb. 17, 1953 |
| 2,796,825 | Kriegbaum | June 25, 1957 |